United States Patent

Cialini et al.

US 8,434,085 B2
Apr. 30, 2013

(54) SCALABLE SCHEDULING OF TASKS IN HETEROGENEOUS SYSTEMS

(75) Inventors: Enzo Cialini, Mississauga (CA); Igor Jurisica, Toronto (CA); Julie Frances Waterhouse, Markman (CA); Edward Guangyuan Xia, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 12/118,229

(22) Filed: May 9, 2008

(65) Prior Publication Data

US 2009/0282413 A1    Nov. 12, 2009

(51) Int. Cl.
*G06F 9/46* (2006.01)

(52) U.S. Cl.
USPC .......................................................... 718/102

(58) Field of Classification Search ............. 718/102
See application file for complete search history.

(56) References Cited

U.S. PATENT DOCUMENTS 6,601,035 B1 * 7/2003 Panagos et al. .............. 705/7.22
7,958,507 B2 * 6/2011 Santos et al. ................. 718/102

OTHER PUBLICATIONS

Ali et al. "Task Execution Time Modeling for Heterogeneous Computing Systems", Heterogeneous Computing Workshop, IEEE, 2000.*
Wu et al., "A High-Performance Mapping Algorithm for Heterogeneous Computing Systems", IEEE, 2001.*
Wu et al., "Segmented Min-Min: A Static Mapping Algorithm for Meta-tasks on Heterogeneous Computing Systems", IEEE, 2000.*
Shivle et al., "Mapping of Subtasks with Multiple Versions in a Heterogeneous Ad Hoc Grid Environment", Parallel and Distributed Computing, 2004. Third International Symposium on/Algorithms, Models and Tools for Parallel Computing on Heterogeneous Networks, 2004. Third International Workshop on Volume, Issue , Jul. 5-7, 2004, pp. 380-387.
Wu et al., "A High-performance mapping Algorithm for Heterogeneous Computing Systems", 2001 IEEE, pp. 1-6. http://www.eece.unm.edu/~shu/lab/paper/00925020.pdf.
Shestak et al., "Greedy Approaches to Static Stochastic Robust Resource Allocation for Periodic Sensor Driven Distributed Systems", 2006 International Conference on Parallel and Distributed Processing Techniques and Applications (PDPTA'06), pp. 3-9, Las Vegas, NV, Jun. 26-29, 2006.
Choi et al., "Task Mapping Algorithm for Heterogeneous Computing System Allowing High Throughput and Load Balancing", V.S. Suinderam et al., (Eds): ICCS 2005, LBCS 3516, pp. 1000-1003, Springer-Verlag Berlin Heidelberg 2005.
Zhi-Gang et al., "General Scheduling Framework in Computation Grid Based on Petri Net", Journal of Central South University of Technology,vol. 12, Suppl.1, Oct. 2005, pp. 232-237 http://www.springerlink.com/content/e266g0037413003n/.

(Continued)

*Primary Examiner* — Jennifer To
*Assistant Examiner* — Brian Chew
(74) *Attorney, Agent, or Firm* — Yee & Associates, P.C.; David A. Mims, Jr.

(57) ABSTRACT

Illustrative embodiments provide a computer implemented method, a data processing system and a computer program product for scalable scheduling of tasks in heterogeneous systems is provided. According to one embodiment, the computer implemented method comprises fetching a set of tasks to form a received input, estimating run times of tasks, calculating average estimated completion times of tasks, producing a set of ordered tasks from the received input to form a task list, identifying a machine to be assigned, and assigning an identified task from the task list to an identified machine.

6 Claims, 4 Drawing Sheets

502 — calculate the Average Estimated Completion Time (AECT) for each task

504 — sort tasks in ascending order in terms of the AECT

506 — initialize the set T = {$T_1$, $T_2$, ..., $T_k$} to contain all tasks

508 — while T is not empty {

510 — fetch the task Ti with the smallest AECT

512 — find a machine with the smallest ECT

514 — assign task $T_i$ to the machine

516 — delete task $T_i$ from T

518 — update the cost matrix

520 — }

500

OTHER PUBLICATIONS

Zheng-Xiong Hou et al., "A Credibility Based Scheduling Algorithm for Computational Grid", Proceedings of the First International Conference on Semantics, Knowledge, and Grid (SKG 2005), 2006 IEEE, pp. 1-3.

"Dynamic Selection of Scheduling Heuristics in Heterogeneous Systems", IBM Technical Disclosure Bulletin, Mar. 30, 2007, pp. 1-3.

"Run Time Estimation Using a Case-based Reasoning System for Scheduling in a Grid Environment", IBM Technical Disclosure Bulletin, Mar. 30, 2007, pp. 1-4.

* cited by examiner

302 — initialize the set T = {T₁, T₂, ..., Tₙ} to contain all tasks
304 — While T is not empty {
306 — for each task in T {
308 — fetch the task and all available machines
310 — calculate ECTs on each machine
312 — find the MECT and the machine
314 — }
316 — find the task T_i with the overall smallest MECT
318 — assign task T_i to the machine
320 — delete task T_i from T
322 — update the cost matrix
324 — }

- 502 — calculate the Average Estimated Completion Time (AECT) for each task
- 504 — sort tasks in ascending order in terms of the AECT
- 506 — initialize the set T = {$T_1, T_2, \ldots, T_k$} to contain all tasks
- 508 — while T is not empty {
- 510 — fetch the task Ti with the smallest AECT
- 512 — find a machine with the smallest ECT
- 514 — assign task $T_i$ to the machine
- 516 — delete task $T_i$ from T
- 518 — update the cost matrix
- 520 — }

500

SCALABLE SCHEDULING OF TASKS IN HETEROGENEOUS SYSTEMS

BACKGROUND OF THE INVENTION

1. Field of the Invention

The present invention relates generally to an improved data processing system for grid scheduling and more specifically, to a computer implemented method, an apparatus, and a computer program product for scalable scheduling of tasks in heterogeneous systems.

2. Description of the Related Art

Grid scheduling is an optimization process for a target function, such as minimizing the application or user's response time, or maximizing system utilization. However, achieving an optimal solution for the target function is NP-complete in general. Therefore, many different heuristics have been proposed and developed, such as Min-min Max-min Seg-min-min, and Dynamic Selection. Min-min and Max-min are the known scheduling heuristics. The two methods were first introduced by Ibarra et al., and have been widely used. Seg-min-min is a modified Min-min heuristic. The Min-min heuristic initializes a set "T", for example "T={$T_1, T_2 \ldots T_n$}" to contain all unscheduled tasks. While "T" is not empty, for each task in "T", the method calculates the Estimated Completion Time (ECT) on each machine by fetching the task and all available machines. The Minimum Estimated Completion Time (MECT) over all machines is then calculated by selecting the best machine for the task. The method then selects a task with the overall smallest minimum estimated completion time and assigns the selected task to the machine. The selected task, "$T_i$", is then deleted from the set of tasks. The remaining tasks are then updated to reflect current status. The process repeats until all tasks in the set "T" are scheduled. The logic behind the Min-min algorithm presumes that if each task is assigned to its optimal machine, the overall response time will be minimal.

The Max-min heuristic is similar to the Min-min heuristic. The difference is that after calculating the minimum estimated completion time for each task in the set, the Max-min heuristic selects a task with the overall largest minimum estimated completion time and assigns it to the slave machine. The Max-min heuristic assumes that if the tasks with the largest costs are assigned first, more tasks can be executed in parallel, which should lead to improved efficiency. The algorithm used for Min-min can be modified by replacing the selection of the overall "smallest" with a selection of the overall "largest" minimum estimated completion time.

As the Min-min algorithm schedules short tasks first, and leaves the large tasks until the end, the Min-min method tends to make the workload unbalanced. The Segmented Min-min (Seg-min-min) algorithm first sorts the set of tasks, and then partitions them into segments of equal size. The segments of larger tasks are scheduled before the segments of smaller ones. In each segment, tasks are scheduled using the Min-min algorithm. Thus, the Seg-min-min combines the ideas of Min-min and Max-min. The scheduling time refers to the one-round time to assign all available tasks to all available machines. For example, the duration commencing when the scheduler starts to schedule the first task until the scheduler finishes the last task.

When the scheduling time is longer than the execution time of a task, machines finish running tasks but cannot receive new tasks to run. This wastes processing resources and degrades system performance. Usually, tasks and machine information are stored in a database. During scheduling, the task and machine information must be loaded into memory. When the number of tasks increases, the scheduling time and the memory requirements increase as well and may exceed available memory. Therefore, the known scheduling algorithms are not scalable and thus, inappropriate for large real systems.

BRIEF SUMMARY OF THE INVENTION

According to one embodiment of the present invention, a computer implemented method for scalable scheduling of tasks in heterogeneous systems is provided. The computer implemented method comprises fetching a list of tasks to form a received input, producing a set of ordered tasks from the received input to form a task list, and assigning an identified task from the task list to an identified machine.

In another embodiment, there is a data processing system for scalable scheduling of tasks in heterogeneous systems. The data processing system comprises a bus, a memory connected to the bus, wherein the memory comprising computer-executable instructions, a communications unit connected to the bus, a display connected to the bus, and a processor unit connected to the bus. The processor unit further executes the computer-executable instructions to direct the data processing system to fetch a list of tasks to form a received input, produce a set of ordered tasks from the received input to form a task list, and assign an identified task from the task list to an identified machine.

In yet another embodiment, there is a computer program product, comprising computer-executable instructions tangibly embodied on a computer-usable recordable type medium, for scalable scheduling of tasks in heterogeneous systems. The computer-executable instructions comprise computer-executable instructions to fetch a list of tasks to form a received input, produce a set of ordered tasks from the received input to form a task list and assign an identified task from the task list to an identified machine.

DETAILED DESCRIPTION OF THE INVENTION

Figure 1:
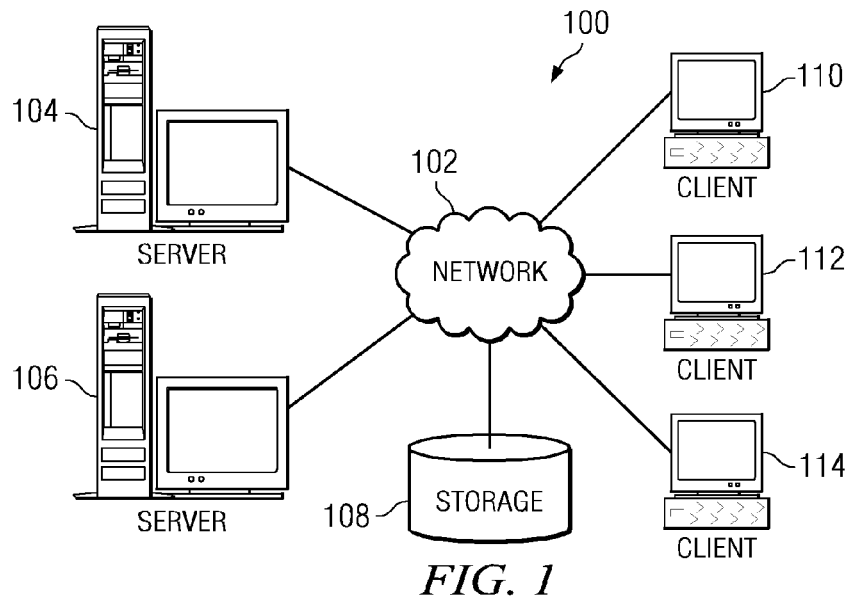
FIG. 1 is a pictorial representation of a grid network of data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
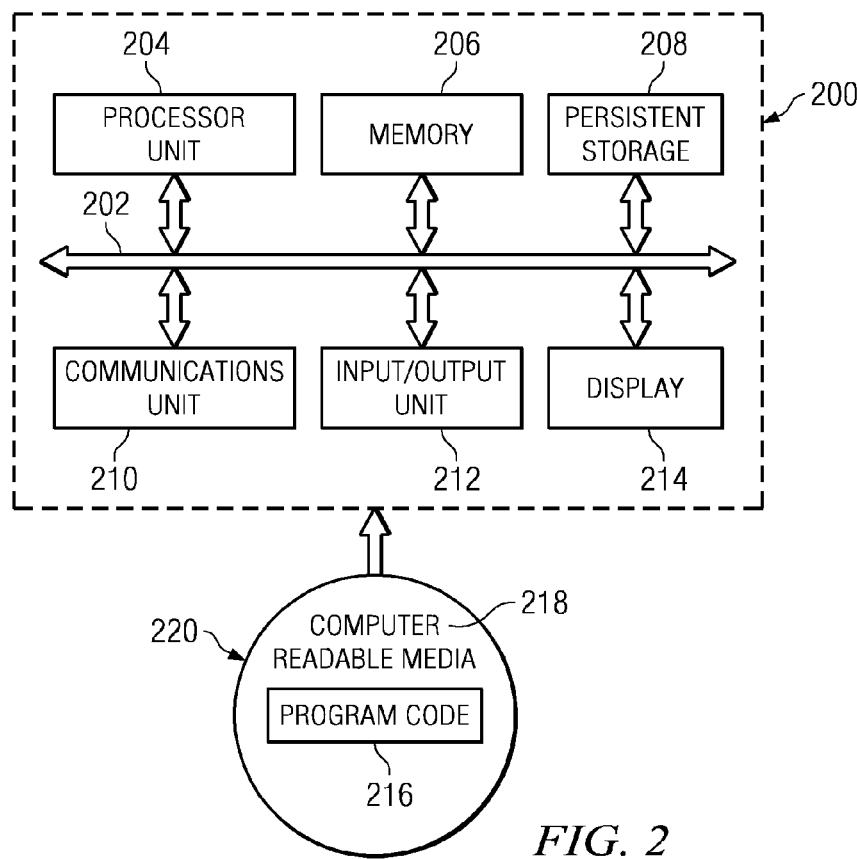
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a grid network of data processing systems in which illustrative embodiments may be implemented. A grid is a type of parallel and distributed system that enables the sharing, selection, and aggregation of geographically distributed resources including hardware, software, and data. System 100 is a grid in which the illustrative embodiments may be implemented. Grid 100 contains network 102, which is the medium used to provide communications links between various devices and computers connected together within grid 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Grid 100 may include additional servers, clients, and other devices not shown.

In the depicted example, Grid 100 is the distributed system with network 102 representing a worldwide collection of networks and gateways that use the Transmission Control Protocol/Internet Protocol (TCP/IP) suite of protocols to communicate with one another. At the heart of the network 102 is a backbone of high-speed data communication lines between major nodes or host computers, consisting of thousands of commercial, governmental, educational and other computer systems that route data and messages. Of course, grid 100 also may be implemented as a number of different types of networks, such as for example, an intranet, a local area network (LAN), or a wide area network (WAN). FIG. 1 is intended as an example, and not as an architectural limitation for the different illustrative embodiments.

In an example using system 100 of FIG. 1, a scheduler on server 104 may wish to schedule a plurality of tasks for the system. The tasks to be scheduled involve processing on three machines, clients 110, 112 and 114. The scheduler can dynamically fetch task and machine information from the database on server 104, and maintain a task and machine list through use of network 102. To further improve the scalability of the known scheduling algorithms, the algorithms have been modified so that only one task is fetched and checked to perform the scheduling of each task. For the scalable Min-min algorithm, the run times of tasks are estimated, and the average estimated completion time (AECT) is calculated. The tasks are then sorted in ascending order in terms of the average estimated completion time. Tasks are fetched in order and assigned to the machine with the smallest estimated completion time, such as client 110. The assigned task "$T_i$" is then deleted from the task list "T". The estimated completion times of remaining tasks on the assigned machine are updated to reflect new status. Compared with the known algorithms, the scalable algorithms significantly reduce the scheduling times.

In another embodiment, there is a grid system, which comprises server machines, client machines, network, and data. A server contains a scheduler which dynamically collects all task and machine information, schedules available tasks to the available machines. Tasks with data are sent to clients via the high-speed network, and executed in client machines.

With reference now to FIG. 2, a block diagram of a data processing system is shown in which illustrative embodiments may be implemented. Data processing system 200 is an example of a machine, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figures 3, 4:
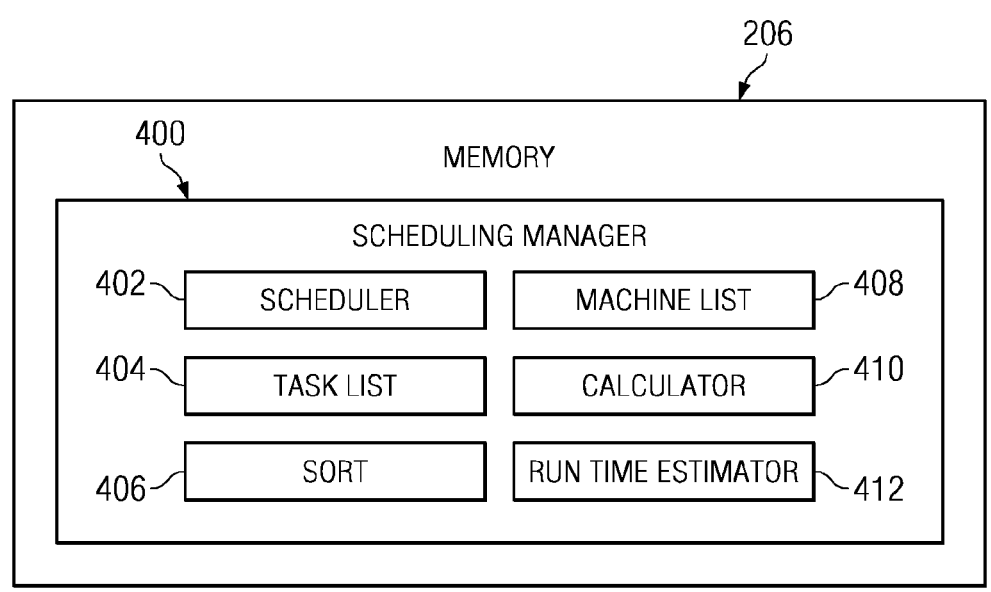
FIG. 3 is text representation of a known Min-min scheduling algorithm.
FIG. 4 is a block diagram of a scheduling manager in accordance with illustrative embodiments.

With reference to FIG. 3, a text representation of a known Min-min scheduling algorithm is shown. The example, in lines 302-324, shows a known scheduling algorithm, such as Min-min. To complete the assignment of one task, as at line 318, the algorithm needs to fetch and check all unassigned tasks, processed in lines 306-314. The time complexity of "fetching" information, of line 308, is represented by "O(m)." The time complexity of the inner 'for' loop is represented by "O(nm)," where "n" is the number of tasks and "m" is the number of machines. An outer "while" loop, in which the task list "T" is not empty, repeats "n" times. Therefore, the time complexity of the whole algorithm is "$O(n^2m)$". The time is typically spent performing disk input/output operations rather than memory access. Disk input/output operations are therefore relatively expensive from a time perspective. As the number of tasks increases, therefore, the scheduling time required grows rapidly.

A large amount of memory is required to store estimated completion times of each task on each machine. Since in the inner 'for' loop, there are "n" tasks and "m" machines in a worst case scenario, the memory space complexity of the known Min-min is represented by "O(nm)." When the number of tasks increases, the memory requirement increases as well, and may even exceed the available memory space.

With reference to FIG. 4, a block diagram of a scheduling manager in accordance with illustrative embodiments is shown. In an illustrative embodiment, a scheduling manager 400 is depicted located within memory 206 of system 200 of FIG. 2. Scheduling manager 400 consists of a number of components comprising a scheduler 402 for selecting and scheduling tasks from a task list 404. Sort 406 is used to order the tasks in a desired sequence prior to selection. A machine list 408 provides a listing of available machines on which tasks may be scheduled. Calculator 410 performs the needed calculations to determine the various completion times of the tasks to be scheduled. Runtime estimator 412 performs calculations to estimate the run times of the tasks.

Scheduling manager 400 although shown within memory 206 of FIG. 2 need not be located as shown. Scheduling manager 400 and components may reside in other memory such as storage 108 of FIG. 1 until loaded for execution.

Scheduler 402 provides a capability of selecting one task from task list 404 rather than all tasks of the task list as previously performed for scheduling. The task selected is typically from the list based on the smallest average estimated completion time calculated. In other embodiments, the task selection may also be based on the largest average estimated completion time.

Sort 406 is a typical sort function capable of providing ordered results. Estimated completion times for tasks are calculated then sorted to produce an ordered list of tasks from which tasks are selected. The task list may also be maintained in a tabular form as needed.

Machine list 408 is a simple list of machines that are available to perform scheduled tasks. The list may be generated from known methods such as querying the systems for availability, polling machines for status or waiting for machines to announce availability.

Calculator 410 provides a capability to calculate average completion time estimates for tasks. The calculated time is then used to order the tasks relative to each other. The calculation is performed in addition to calculations for memory space requirements.

Runtime estimator 412 predicts the execution times of tasks on machines. Many different methods can be used to estimate runtimes. For example, a case-based reasoning approach, in which run times are estimated using previous runtime information stored in a case base, may be used.

To further improve the scalability of the scheduling algorithms, the known algorithms have been modified so that only one task is fetched and checked to perform the scheduling of each task. For the Min-min algorithm, the average estimated completion time (AECT) for each task is first calculated. The tasks are then sorted in ascending order in terms of the AECT and then tasks are fetched in order. The modified scalable algorithm may be called Sca-min-min.

The Max-min algorithm may be modified in a similar manner. In the Max-min method the tasks are ordered in descending order in terms of the average estimated completion time prior to the tasks being fetched. The Seg-min-min method partitions tasks into segments with the equal size. For each segment of the Seg-min-min method, the scheduling of tasks uses the modified Sca-min-min method. The modified methods of Max-min and Seg-min-min may be then called Sca-max-min and Sca-seg-min-min scalable scheduling heuristics, respectively.

The run times of tasks may be viewed as strictly consistent when the ratio of time to execute a task "$T_i$" on machines "$M_x$" and "$M_y$" is expressed as "$\tau (\tau \in R^+)$", then the ratio of the time to execute any other task "$T_k$" on the same two machines is expressed as "$\tau + \delta_k$", where "$\delta_k$" represents a value much smaller than "$\tau$". It can be mathematically proved that when the run times of tasks are strictly consistent, then the modified algorithms Sca-min-min, Sca-max-min, Sca-seg-min-min are equivalent to Min-min, Max-min and Seg-min-min, respectively. The modifications performed enable the modified algorithms to be scalable.

Figures 5, 6:
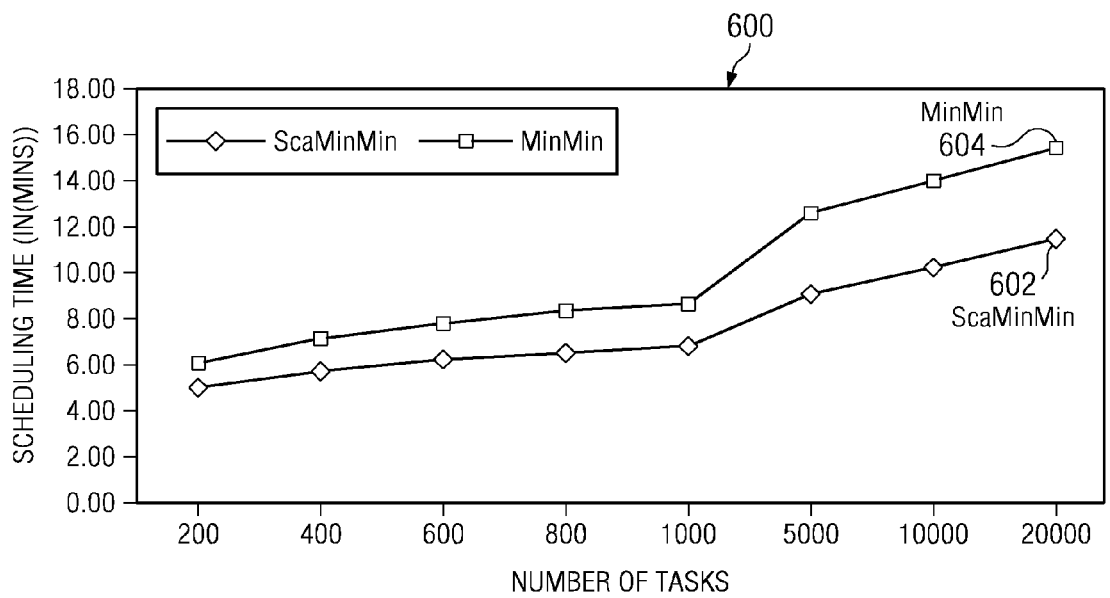
FIG. 5 is a text representation of a scalable Min-min scheduling algorithm, in accordance with illustrative embodiments.
FIG. 6 is a line chart of a performance comparison between a known and a scalable scheduling algorithm result, in accordance with illustrative embodiments.

With reference to FIG. 5, a text representation of a Sca-min-min scheduling algorithm is shown. The scheduling algorithm, as shown in lines 502-520 of Sca-min-min scheduling algorithm 500, calculates the average estimated completion time for each task in the task list. The tasks are then sorted in ascending order according to the calculated average estimated completion times. The set of tasks is initialized, for example "$T=\{T_1, T_2 \ldots T_k\}$" to contain all unscheduled tasks. While "T" is not empty, fetch the task "$T_i$" having the smallest average estimated completion time and all available machines. Then, as stated in line 512, find a machine with the smallest estimated completion time and assign the task to the machine, as in line 514. The assigned task "$T_i$" is then deleted from the task list "T," line 516. The estimated completion times of other tasks on the identified machine are then updated, as stated in line 518.

To schedule one task as in line 514, the algorithm fetches that task only, as in line 510. The time complexity of fetching the task and machine information is defined as "O(m)," and the 'while' loop, of while "T" is not empty, repeats "n" times, where "n" is the number of tasks and "m" is the number of machines. The time complexity of fetching, assigning and updating, stated in lines (508-520) is represented by "O(nm)." The calculation of the average estimated completion time for each task is given as "O(nm)." The time to sort tasks is represented as "O(n log n)." Thus, the time complexity of the modified Sca-min-min method is given by the expression "max(O(nm), O(n log n))=O(nm)," since usually, "log n" is much smaller than the value of "m."

The space complexity is represented by "O(m)" for the calculation of the average estimated completion times and the fetching of the tasks operations. Memory resources are also required when sorting tasks. A determination of the quantity of memory required usually depends on the sorting algorithm applied. Unlike the Min-min method, the Sca-min-min method does not exceed the available memory when the number of tasks increases. The analysis of time and space complexities for Sca-max-min and Sca-seg-min-min is similar and therefore omitted.

In an example implementation, sorting of tasks may be performed using a separate table. Once sorted, the tasks may be added back into the task table in the sorted order. In an example implementation, simulation of the use of the method was performed to provide a preliminary evaluation of system performance in terms of the total run times of a set of tasks. The example tested different grid configurations, using different numbers of tasks and machines. The number of tasks varied among 100, 500, or 1000, while the number of machines was either 16 or 32. A cost matrix was created in which rows represented tasks (i) and columns represented machines (j). The entry (i,j) of the matrix represented a "cost," or run time, of the task "i" on the machine "j." The costs, while randomly generated, are strictly consistent. The example scheduled tasks on machines using known algorithms and then again using the modified scalable algorithms. The metric is the total run times of all tasks. The results show that the difference between known algorithms and the modified scalable algorithms is typically between −0.76~1.16%, meaning there is little or no performance cost to making the known algorithms scalable.

With reference now to FIG. 6, a line chart of a performance comparison between a known and a scalable scheduling algorithm result, in accordance with illustrative embodiments is shown. In this example, an experiment was performed to compare the scheduling times by using the known Min-min algorithm and then scalable Min-min algorithm. The system contained one server and 50 client machines. The number of tasks varied from 200, 400, 600, 800, 1000, 5000, 10000, to 20000. Each set of tasks ran three times using known algorithms and scalable algorithms, respectively. The average scheduling times, using a confidence interval >98% were calculated. FIG. 6 depicts chart 600 that provides a comparison of the scheduling times between Sca-Min-Min 602 and Min-Min 604. Results of the comparison between Sca-Max-min and Max-min, and Sca-Seg-Min-Min and Seg-Min-Min are similar. To improve visibility of scheduling times at the number of tasks above 5000, the natural logarithmic values for the y-axis is used. FIG. 6 demonstrates that the scalable Min-min algorithm may reduce the total scheduling time by approximately 64%-98% when compared with the known Min-min algorithm. With the increased number of tasks, the performance improvement typically increases as well.

Figure 7:
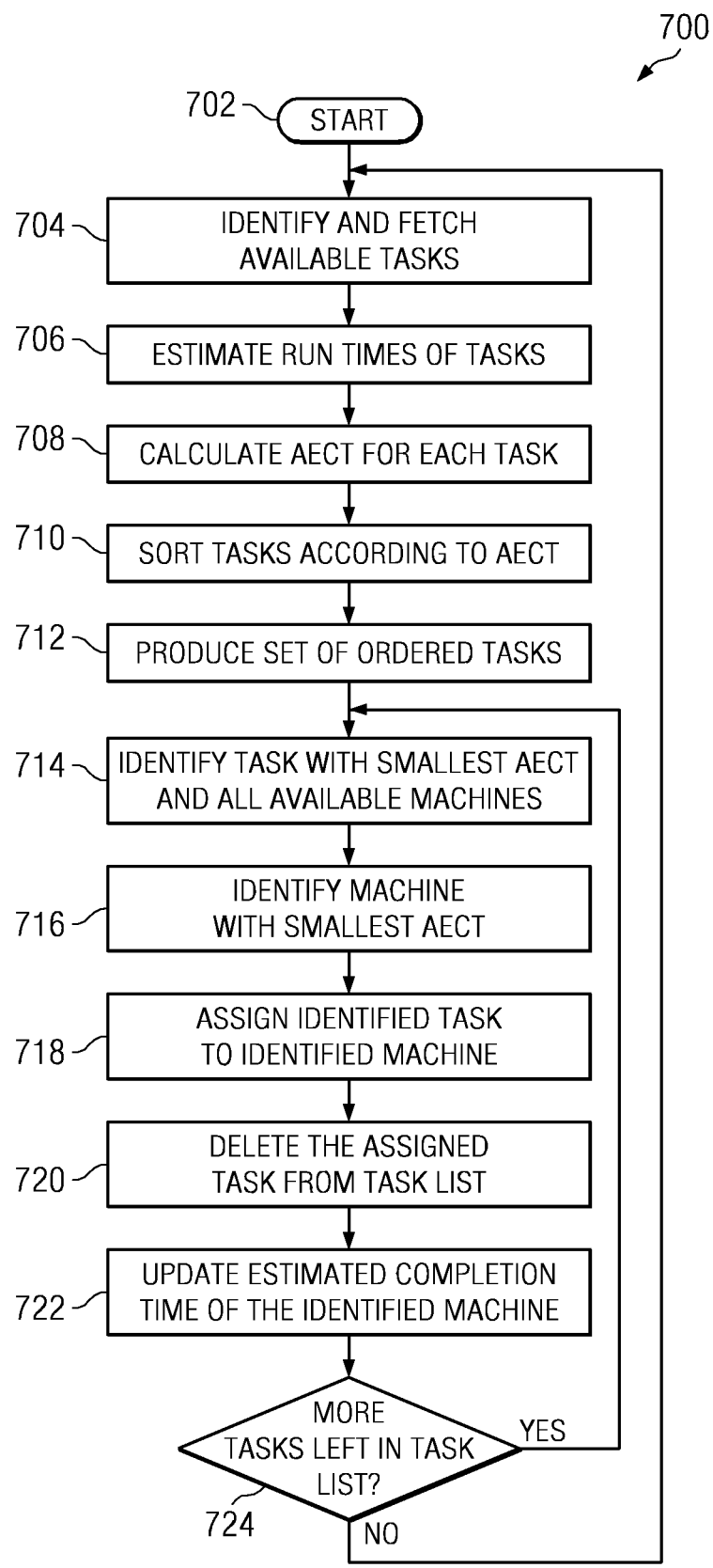
FIG. 7 is a flowchart of a task scheduling process example using the scalable Min-min algorithm in accordance with illustrative embodiments.

With reference to FIG. 7 a flowchart of a task scheduling process in accordance with illustrative embodiments is shown. Task scheduling process 700 is an example embodiment using the Sca-Min-Min algorithm and scheduling manager 400 of FIG. 4.

Scheduling process 700 starts (step 702) and fetches a set of tasks to form a list input (step 704). The set of tasks input is typically a list of task identifiers for those tasks, including tasks newly added into the system waiting to be scheduled by the scheduler. The set of task may be one or more tasks. A runtime estimator predicts execution times of tasks (step 706). And a calculator is invoked to calculate an average estimated completion time for each task in the task list (step 708).

Having calculated the times for each task, the tasks are sorted according to criteria, in this example, of the respective average estimated completion time for each task (step 710). The sorting operation may be performed in a separate work space or table and the results returned to the task list. The task list may also be sorted in place. Either method or other methods that produce the same results may be used. The ordered tasks, when sorted outside of the task list as in this example, are returned to produce a set of ordered tasks (step 712). Depending upon the desired order, the task list may be established in ascending or descending order.

In this example, a task with the smallest average estimated completion time is identified as well as all available machines (step 714). The available machines are examined to identify the machine having the smallest estimated completion time (step 716). The identified task with the smallest average estimated completion time is then assigned to the identified machine with the smallest estimated completion time (step 718).

Having assigned the task in step 718, an operation to delete the task from the task list is performed (step 720). An update of estimated completion times of other tasks in the task list on the identified machine is performed (step 722).

A determination is made whether there are more tasks to process (step 724). When a determination is made that there are more tasks, a "yes" result is obtained. When a determination is made that there are no more tasks in the task list, a "no" result is obtained.

Responsive to a "yes" result in step 724, process 700 loops back to step 714 to continue scheduling of the remaining tasks in the task list. Responsive to a "no" result in step 724, process 700 finishes the current iteration of scheduling, loops back to step 704, and starts the next iteration.

In the example of an illustrative embodiment, the run times of tasks are estimated, and the average estimated completion time is calculated. The tasks are then sorted in ascending order in terms of the average estimated completion time. Tasks are fetched, individually, in order from the list and assigned to the machine with the smallest estimated completion time. The assigned task "$T_i$" is then deleted from the task list "T." The estimated completion times of remaining tasks on the assigned machine are updated to reflect new status. Compared with the known algorithms, the scalable algorithms typically significantly reduce the memory required for scheduling and the scheduling times.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for scalable scheduling of tasks in heterogeneous systems, the computer implemented method comprising:
    a computer fetching tasks to form a received input;
    the computer estimating a run time for each task in the received input using previous runtime information stored in a data base;
    the computer calculating, responsive to estimating the run time for each task in the received input, an average estimated completion time for each task of the received input;
    the computer sorting, responsive to calculating an average estimated completion time for each task of the received input, the tasks according to each task's average estimated completion time to form a task list;
    the computer identifying a task within the task list having a smallest average estimated completion time to form an identified task;
    the computer identifying a particular machine having a smallest estimated completion time to form an identified machine;
    the computer assigning the identified task from the task list to the identified machine, thereby scheduling the identified task; and
    the computer updating an estimated completion time of the identified machine, wherein updating the estimated completion time of the identified machine further comprises: adding an estimated run time of the identified task to the estimated completion time of the identified machine.

2. The computer implemented method of claim 1, wherein assigning the identified task from the task list to the identified machine further comprises:
    the computer deleting the identified task from the task list.

3. A data processing system for scalable scheduling of tasks in heterogeneous systems, the data processing system comprising:
    a bus;
    a memory connected to the bus;
    one or more non-transitory computer readable storage devices connected to the bus;
    a communications unit connected to the bus;
    a display connected to the bus; and
    a processor unit connected to the bus;
    computer readable instructions stored on at least one of the one or more non-transitory computer readable storage devices for execution by the processor unit via the memory for fetching tasks to form a received input;
    computer readable instructions for execution by the processor unit via the memory for estimating a run time for each task in the received input using previous runtime information stored in a data base;
    computer readable instructions for execution by the processor unit via the memory for calculating, responsive to estimating the run time for each task in the received input, an average estimated completion time for each task of the received input;
    computer readable instructions for execution by the processor unit via the memory for sorting, responsive to calculating an average estimated completion time for each task of the received input, the tasks according to each task's average estimated completion time to form a task list;

computer readable instructions for execution by the processor unit via the memory for identifying a task within the task list having a smallest average estimated completion time to form an identified task;

computer readable instructions for execution by the processor unit via the memory for identifying a particular machine having a smallest estimated completion time to form an identified machine;

computer readable instructions for execution by the processor unit via the memory for assigning the identified task from the task list to the identified machine, thereby scheduling the identified task; and computer readable instructions for execution by the processor unit via the memory for updating an estimated completion time of the identified machine, wherein the computer readable instructions for execution by the processor unit via the memory for updating the estimated completion time of the identified machine further comprises: computer readable instructions for execution by the processor unit via the memory for adding an estimated run time of the identified task to the estimated completion time of the identified machine.

4. The data processing system of claim 3, further comprising:

computer readable instructions for execution by the processor unit via the memory for deleting the identified task from the task list.

5. A computer program product for scalable scheduling of tasks in heterogeneous systems, the program product comprising:

one or more non-transitory computer readable storage devices;

computer readable instructions stored on at least one of the one or more non-transitory computer readable storage devices for fetching a set of tasks to form a received input;

computer readable instructions stored on at least one of the one or more non-transitory computer readable storage devices for estimating a run time for each task in the received input using previous runtime information stored in a data base;

computer readable instructions stored on at least one of the one or more non-transitory computer readable storage devices for calculating, responsive to estimating the run time for each task in the received input, an average estimated completion time for each task of the received;

computer readable instructions stored on at least one of the one or more non-transitory computer readable storage devices for sorting, responsive to calculating an average estimated completion time for each task of the received input, the tasks according to each task's average estimated completion time to form a task list;

computer readable instructions stored on at least one of the one or more non-transitory computer readable storage devices for identifying a task within the task list having a smallest average estimated completion time to form an identified task;

computer readable instructions stored on at least one of the one or more non-transitory computer readable storage devices for identifying a particular machine having a smallest estimated completion time to form an identified machine;

computer readable instructions stored on at least one of the one or more non-transitory computer readable storage devices for assigning the identified task from the task list to the identified machine, thereby scheduling the identified task; and computer readable instructions stored on at least one of the one or more non-transitory computer readable storage devices computer executable instructions for updating an estimated completion time of the identified machine, wherein the computer readable instructions stored on at least one of the one or more non-transitory computer readable storage devices computer executable instructions for updating the estimated completion time of the identified machine further comprises computer executable instructions for adding an estimated run time of the identified task to the estimated completion time of the identified machine.

6. The computer program product of claim 5, further comprising:

computer readable instructions stored on at least one of the one or more non-transitory computer readable storage devices for deleting the identified task from the task list.

* * * * *